United States Patent
Miyake et al.

(10) Patent No.: US 8,188,909 B2
(45) Date of Patent: May 29, 2012

(54) OBSERVATION SIGNAL PROCESSING APPARATUS

(75) Inventors: Yasuyuki Miyake, Toyota (JP); Asahi Kondou, Kariya (JP); Gaku Takano, Yokohama (JP)

(73) Assignee: Denso Corporation, Kariya (JP)

( * ) Notice: Subject to any disclaimer, the term of this patent is extended or adjusted under 35 U.S.C. 154(b) by 40 days.

(21) Appl. No.: 12/928,911

(22) Filed: Dec. 22, 2010

(65) Prior Publication Data
US 2011/0156945 A1      Jun. 30, 2011

(30) Foreign Application Priority Data

Dec. 25, 2009   (JP) .................................. 2009-294290

(51) Int. Cl.
*G01S 13/42* (2006.01)
(52) U.S. Cl. .......... 342/109; 342/70; 342/174; 342/189; 342/195
(58) Field of Classification Search ................... 342/70, 342/109–112, 173–174, 189, 195
See application file for complete search history.

(56) References Cited

U.S. PATENT DOCUMENTS

| | | | | |
|---|---|---|---|---|
| 3,372,389 A | * | 3/1968 | Bellman et al. ................. | 342/89 |
| 5,374,931 A | * | 12/1994 | Wiener ......................... | 342/115 |
| 6,317,073 B1 | * | 11/2001 | Tamatsu et al. ................. | 342/70 |
| 6,335,701 B1 | * | 1/2002 | Fujisaka et al. ............... | 342/115 |
| 7,265,712 B2 | * | 9/2007 | Merkel et al. .................. | 342/195 |
| 7,656,344 B2 | * | 2/2010 | Inaba ............................ | 342/70 |
| 2009/0207068 A1 | * | 8/2009 | Inaba ............................ | 342/70 |
| 2010/0019954 A1 | * | 1/2010 | Mizutani et al. ............... | 342/147 |
| 2011/0156945 A1 | * | 6/2011 | Miyake et al. .................. | 342/70 |

FOREIGN PATENT DOCUMENTS

| | | |
|---|---|---|
| JP | 2001-194451 | 7/2001 |
| JP | 2008-20432 | 1/2008 |

OTHER PUBLICATIONS

Mahafza, Bassem R., "Radar Systems Analysis and Design Using MATLAB" Second edition 2005, pp. 145-163.
U.S. Appl. No. 12/928,913, filed Dec. 22, 2010, Miyake, et al.

* cited by examiner

*Primary Examiner* — John B Sotomayor
(74) *Attorney, Agent, or Firm* — Harness, Dickey & Pierce, PLC

(57) ABSTRACT

An observation signal processing apparatus transmits pulse signals as search signals per each search, generates observation values based on reflected signals against a target and delay modulation pulse signals, and performs coherent integration on the observation values to output an integration value. The apparatus includes a section for storing a coherent integration count, a section for transmitting pulse signals equivalent to the coherent integration count, a section for calculating a phase correction amount based on an estimated relative speed, and a section for performing phase-weighted coherent integration on the observation values based on the phase correction amount.

7 Claims, 3 Drawing Sheets

OBSERVATION SIGNAL PROCESSING APPARATUS

CROSS REFERENCE TO RELATED APPLICATION

This application is based on and incorporates herein by reference Japanese Patent Application No. 2009-294290 filed on Dec. 25, 2009.

FIELD OF THE INVENTION

The present invention relates to an observation signal processing apparatus, which is applicable to target object observation devices such as sonars and radars that are mounted on mobile bodies (e.g., ships, vehicles and aircraft) and are capable of detecting a target by transmitting a pulse signal and receiving a reflected signal of the pulse signal from the target.

BACKGROUND OF THE INVENTION

Conventionally, a coherent integration technique is well known in this type of target observation devices. As described in non-patent document 1, for example, the coherent integration improves a signal-to-noise ratio (SNR) by averaging observation values acquired from the reflected signal from the target.

The coherent integration provides signal processing using the statistical nature as follows. It is supposed that the independent identical distribution characterizes observation values. Averaging these values for the number of times assumed to be $NUM_{CI}$ multiplies the SNR as an output value after the averaging by $NUM_{CI}$ according to the central limit theorem. In this case, the SNR between an input signal and an output value is equivalent to a process gain that is multiplied by $NUM_{CI}$ as follows.

Process gain=(Output SNR)/(Input SNR)

Non-patent Document 1: Mahafza, Bassem R. 2005. Radar Systems Analysis and Design Using MATLAB®. 2d ed. Chapman & Hall/CRC, Taylor & Francis Group, ISBN-10: 1-58448-532-7, ISBN-13: 978-1-58488-532-0: 4.4.1-4.4.2

The technique provides an excellent result when there is no relative speed between the observation device and a target. When there is any relative speed between the observation device and a target, however, performing the coherent integration on a reflected wave from the target degrades a signal component due to an effect of the relative speed. The process gain degrades compared to a motionless target.

SUMMARY OF THE INVENTION

It is an object of the present invention to provide an observation signal processing apparatus capable of excellent coherent integration applied to a reflected wave even when a relative speed is present between an observation device and a target object.

According to the present invention, and observation signal processing apparatus successively transmits pulse signals as search signals modulated by carrier waves a plurality of times per search from a transmission antenna to a domain to be observed, captures a plurality of reflected signals, being part of the search signals reflected on a target in the domain, at a receiving antenna, performs correlative detection based on the captured reflected signals and delay modulation pulse signals equivalent to delayed version of the pulse signals modulated by the carrier waves to generate a plurality of observation values per search, performs coherent integration on the generated observation value, and supplies outward a specified coherent integration value per search as integration output. The observation value has a phase, which includes information about a relative distance to the target, and an amplitude, which includes information about a relative distance to the target and a reflected sectional area of the target. The observation signal processing apparatus comprises a first memory, a search signal transmission section, an observation data memory, a second memory, a phase correction amount calculation section and a phase-weighted coherent integration section.

The first memory stores a coherent integration count corresponding to the domain to be observed. The search signal transmission section retrieves the coherent integration count corresponding to the domain to be observed from the first memory and transmitting the pulse signals as the search signals equivalent to the retrieved coherent integration count from the transmission antenna. The observation data memory controls the receiving antenna to capture reflected waves as the reflected signals for the transmitted pulse signals equivalent to the coherent integration count and storing the reflected signals as the observation values. The second memory stores an estimated relative speed for the search. The phase correction amount calculation section retrieves the estimated relative speed of the target from the second memory and calculating a phase correction amount based on the retrieved estimated relative speed. The phase-weighted coherent integration section performs phase-weighted coherent integration on the observation values equivalent to the coherent integration count based on the calculated phase correction amount and supplying outward the acquired integration output.

BRIEF DESCRIPTION OF THE DRAWINGS

The above and other objects, features and Advantages of the present invention will become more apparent from the following detailed description made with reference to the accompanying drawings.

DETAILED DESCRIPTION OF THE PREFERRED EMBODIMENTS

A preferred embodiment of the present invention will be described with reference to accompanying drawings.

Figure 1:
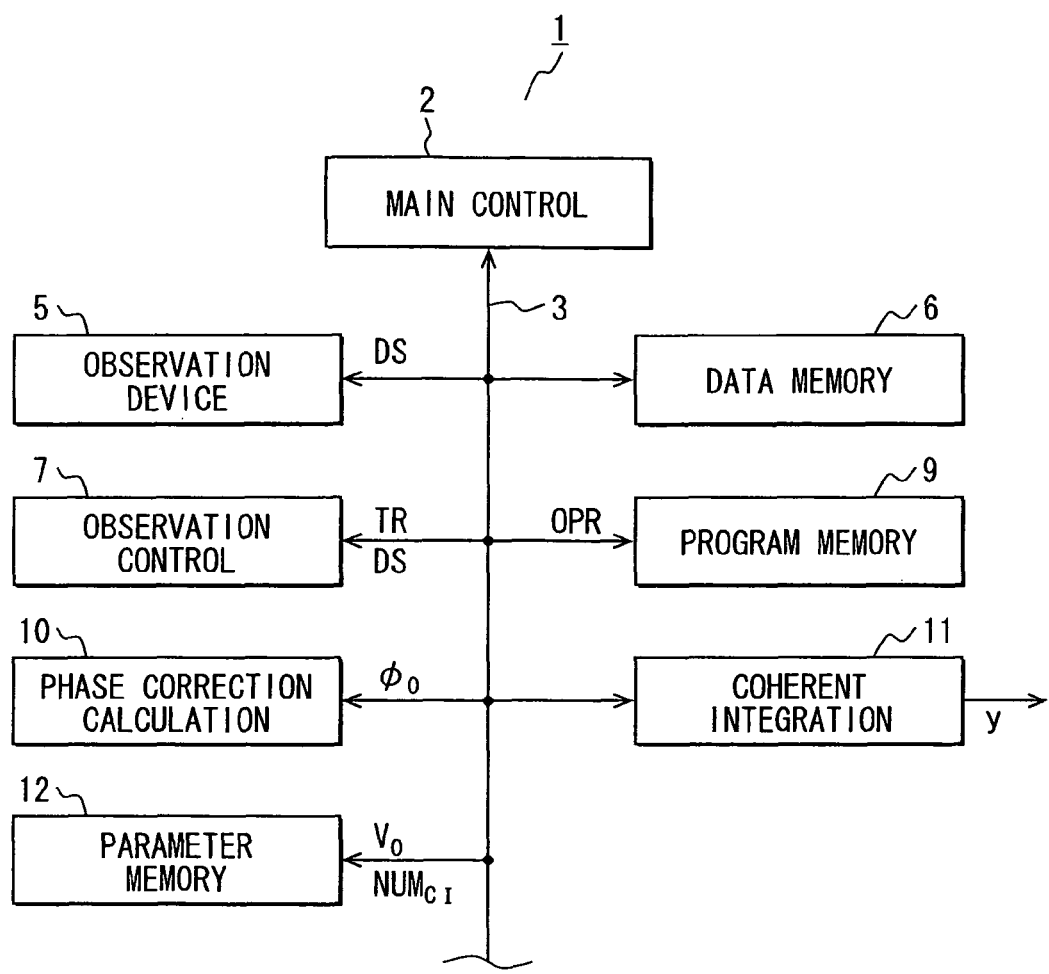
FIG. 1 is a block diagram showing an embodiment of an observation signal processing apparatus according to the invention.

Referring to FIG. 1, an observation signal processing apparatus 1, which configures a sonar or a radar, includes a main control section 2. Via a bus 3, the main control section 2 connects with an observation device 5, an observation data memory 6, an observation control section 7, observation program memory 9, a phase correction amount calculation section 10, a phase-correction-weighted coherent integration section 11 connected to a target detection section (not shown), and a parameter memory 12. The observation signal processing apparatus 1 connects with many other components, although not shown in FIG. 1.

Figure 2:
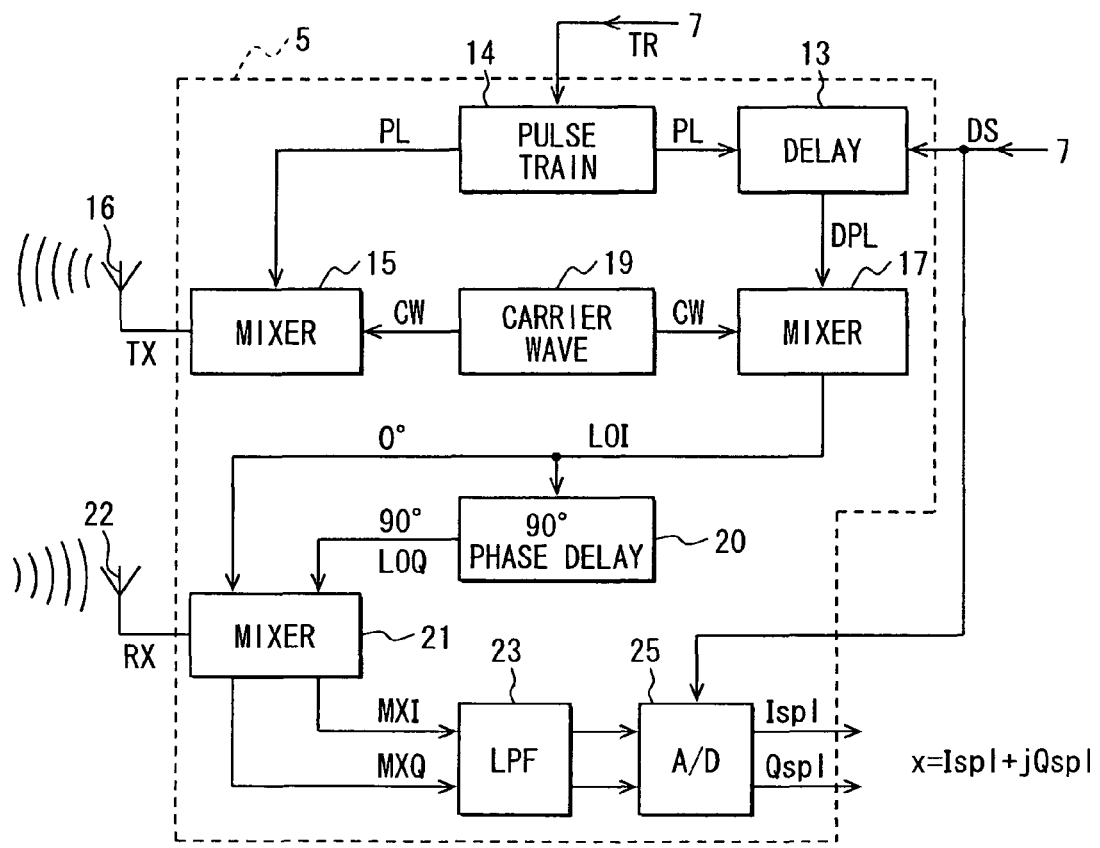
FIG. 2 is a block diagram showing an observation device provided in the observation signal processing apparatus.

As shown in FIG. 2, the observation device 5 includes a delay circuit 13. The delay circuit 13 connects with a pulse train generator 14 and a mixer 17. The pulse train generator 14 connects with a mixer 15 connected to a transmission antenna 16. The mixer 15 connects with a carrier wave oscillator 19 connected to the mixer 17. The mixer 17 connects with a 90-degree phase delay circuit 20 and a mixer 21 connected to a receiving antenna 22. The mixer 21 connects with an analog/digital (A/D) converter 25 via a low-pass filter (LPF) 23.

The observation signal processing apparatus 1 shown in FIG. 1 actually functions as a computer and retrieves and executes a given control program stored in a memory (not shown). Although not shown, the CPU and the memory of the observation signal processing apparatus 1 operate on the basis of multitasking and time-sharing to perform functions corresponding to the functional blocks shown in FIG. 1. The observation signal processing apparatus 1 may be configured as a hardware apparatus corresponding to each block. Furthermore, the CPU or MPU may be provided for each block in a decentralized manner to control the blocks.

In the observation signal processing apparatus 1 configured as described above, the main control section 2 retrieves an observation program OPR stored in the observation program memory 9 to observe a target. The main control section 2 controls the observation control section 7 to observe the target based on the retrieved observation program OPR.

Based on the observation program OPR, the observation control section 7 outputs a domain signal DS to the delay circuit 13 and the A/D converter 25 in the observation device 5. The domain signal DS specifies a domain, where a target to be observed is expected to exist or where a target is to be searched for. For example, this domain can be identified by specifying a distance from the transmission antenna 16 (and the receiving antenna 22) to the target to be searched for. At the same time, the observation control section 7 outputs a trigger signal TR to the pulse train generator 14 in the observation device 5 at proper timings. The trigger signal TR triggers generation of a pulse signal for target observation.

In the observation device 5, the carrier wave oscillator 19 generates a carrier wave CW at a given frequency and outputs it to the mixers 15 and 17. The mixer 15 mixes the carrier wave CW output from the carrier wave oscillator 19 with a pulse signal PL generated by the pulse train generator 14 in response to the trigger signal TR. The mixer 15 thus generates a search signal TX that contains the pulse signal PL modulated by the carrier wave CW. The transmission antenna 16 radiates the search signal TX. The search signal TX radiated from the transmission antenna 16 is reflected on the target. A part of the reflected signal is recognized as a reflected signal RX that is then received at the receiving antenna 22 and is supplied to the mixer 21.

The delay circuit 13 is supplied with the domain signal DS from the observation control section 7. The domain signal DS indicates the time corresponding to the distance used to search for the target. The delay circuit 13 supplies a delay equivalent to that time for the pulse signal PL output from the pulse train generator 14 to generate a delay pulse signal DPL. The delay circuit 13 then outputs it to the mixer 17. The mixer 17 mixes the carrier wave CW output from the carrier wave oscillator 19 with the delay pulse signal DPL to generate a domain delay signal LOI modulated by the carrier wave CW. The mixer 17 outputs the domain delay signal LOI to the mixer 21 and a 90-degree phase delay circuit 20, which is a phase converter.

The 90-degree phase delay circuit 20 shifts the phase of the supplied domain delay signal LOI by 90 degrees to generate an orthogonal domain delay signal LOQ. The 90-degree phase delay circuit 20 then outputs it to the mixer 21. The signal LOI is referred to as "I phase" and the signal LOQ is referred to as "Q phase" for the convenience of distinction between the signals LOI and LOQ with the 90-degree phase difference. The mixer 21 mixes the reflected signal RX received at the receiving antenna 22 with the domain delay signal LOI and the orthogonal domain delay signal LOQ for correlative detection. The signals LOI and LOQ are delay modulation pulse signals that are delayed for the time equivalent to the domain for searching for the target, i.e., equivalent to the distance. The mixer 21 then generates an I-phase mixed signal MXI and a Q-phase mixed signal MXQ and outputs them to the A/D converter 25 via the low-pass filter 23. The A/D converter 25 converts the I-phase mixed signal MXI and the Q-phase mixed signal MXQ into corresponding digital signals at the timing corresponding to the domain signal DS or the distance for target searching to generate I-phase sample output $I_{spl}$ and Q-phase sample output $Q_{spl}$.

The observation control section 7 stores the I-phase sample output $I_{spl}$ and the Q-phase sample output $Q_{spl}$ as $x=I_{spl}+jQ_{spl}$ in the observation data memory 6 each time the reflected signal RX is observed. The trigger signal TR from the observation control section 7 controls the pulse train generator 14 to radiate the pulse signal PL to the domain (target) for the target search. A process gain of process signals required for the domain determines the number of pulse signals PL per search, accordingly, the number of reflected signals RX to be received from the target present in the domain. The process gain corresponds to that of a coherent integration value output from the phase-correction-weighted coherent integration section 11. Normally, the value corresponds to coherent integration count $NUM_{CI}$, which indicates the number of the coherent integration operations the phase-correction-weighted coherent integration section 11 processes.

The coherent integration count $NUM_{CI}$ is stored in the parameter memory 12 of the observation signal processing apparatus 1 with respect to each domain (distance) to be searched for. The parameter memory 12 is thus used as a first memory for storing the coherent integration count. When the domain to be searched for (to be observed) is determined based on the observation program OPR, the observation control device 7 retrieves the corresponding coherent integration count $NMM_{CI}$ from the parameter memory 12 and determines the number of pulse signals PL (equivalent to coherent integration count $NMM_{CI}$) based on the retrieved coherent integration count. This number of pulse signals PL indicates the number of pulse signals to be radiated from the transmission antenna 16 in each search operation. The observation control section 7 controls the pulse train generator 14 and the transmission antenna 16 of the observation device 5 to transmit the pulse signal PL equivalent to the coherent integration count $NUM_{CI}$ as the search signal TX to the domain where the target is to be searched for.

When a target is present in the domain for the search, a part of the search signal TX is reflected on the target and is received as the reflected signal RX at the receiving antenna 22. The receiving antenna 22 captures the reflected signal RX equivalent to the coherent integration count $NUM_{CI}$ equal to the number of pulse signals PL contained in the search signal.

The observation data memory 6 stores observation values for the reflected signal RX per search, i.e., at least the observation values X(0) through X($NUM_{CI}$−1) for the reflected signal RX equivalent to the coherent integration count $NUM_{CI}$ retrieved from the parameter memory 12. At this time, the main control section 2, based on the observation program OPR, controls the phase-correction-weighted coherent integration section 11 to perform the coherent integration on the observation values X(0) through X($NUM_{CI}$−1).

It is supposed that the observation value stored in the observation data memory 6 per search is $NUM_{CI}$, which is the coherent integration count $NUM_{CI}$. As a result, as many samples as $NUM_{CI}$ are available as observation values.

The following equations (1) and (2) express a model for the i-th sample, where i is set to 0.

$$x(0) = A_{RX}\exp(j\omega_0 \cdot TOF(0)) + n(0) \quad (1)$$
$$= s(0) + n(0)$$

$$TOF(0) = \frac{2R_0}{V_c - V} \quad (2)$$

Equations (3) and (4) express a model for the i-th sample, where i is set to 1.

$$x(1) = A_{RX}\exp(j\omega_0 \cdot TOF(1)) + n(1) \quad (3)$$
$$= s(1) + n(1)$$
$$= s(0)\exp\left(j\omega_0 \cdot \frac{2V \cdot PRI}{V_c - V}\right) + n(1)$$

$$TOF(1) = \frac{2(R_0 + V \cdot PRI)}{V_c - V} \quad (4)$$
$$= TOF(0) + \frac{2V \cdot PRI}{V_c - V}$$

Equations (5) and (6) express a model for the i-th sample, where i is set to k.

$$x(k) = A_{RX}\exp(j\omega_0 \cdot TOF(k)) + n(k) \quad (5)$$
$$= s(k) + n(k)$$
$$= s(0)\exp\left(j\omega_0 \cdot \frac{2V \cdot PRI}{V_c - V} \cdot k\right) + n(k)$$
$$= s(0)\exp(j\phi \cdot k) + n(k)$$

$$TOF(k) = \frac{2(R_0 + V \cdot k \cdot PRI)}{V_c - V} \quad (6)$$
$$= TOF(0) + \frac{2V \cdot PRI}{V_c - V} \cdot k,$$

where $\phi \overset{\Delta}{=} \omega_0 \cdot \frac{2V}{V_c - V} \cdot PRI$

In equations (1) to (6):
$A_{RX}$ is a complex amplitude;
$\omega_0$ is an angular frequency of the carrier;
$R_0$ is a relative distance to the target when i is set to 0;
PRI is a pulse transmission interval;
$V_C$ is a light speed;
V is a relative speed of the target;
s(i) is a signal component where i is set to 0 through k; and
n(i) is a noise component where i is set to 0 through k.

In terms of each observation value (sample), the phase includes information about the relative distance to the target. The amplitude includes the information about the relative distance to the target and a reflected sectional area.

The phase-correction-weighted coherent integration section 11 then performs coherent integration on the acquired samples (observation values) equivalent to the $NUM_{CI}$ count. At this time, the phase-correction-weighted coherent integration section 11 requests the phase correction amount calculation section 10 to determine the phase correction amount for the coherent integration performed on the observation values. In response to this, the phase correction amount calculation section 10 calculates phase correction amount $\phi_0$ based on equation (7).

$$\phi_0 \overset{\Delta}{=} \omega_0 \cdot \frac{2V_0}{V_c - V_0} \cdot PRI \quad (7)$$

The estimated relative speed $V_0$ represents a relative speed estimated between the observation signal processing apparatus 1 and a target to be searched for. The value is defined as any of the following.

(1) A center value of estimated relative speeds in relation to a target to be searched for in the domain.

(2) A value appropriate to operation mode (operation state) of a vehicle (mobile body) where the observation signal processing apparatus 1 is mounted. For example, the operation modes are applicable to automatic cruising, pre-crash safety, front collision warning, and lane change warning.

(3) A value corresponding to the distance to a target to be searched for.

(4) A negative relative speed value, i.e., a relative speed value of a target that is moving toward a mobile object such as a vehicle mounted with the observation signal processing apparatus 1.

The parameter memory 12 stores such values as default values for these determinant factors (1) to (4). The parameter memory 12 is thus used as a second memory for storing the estimated relative speed. Based on the observation program OPR, the phase correction amount calculation section 10 retrieves the estimated relative speed corresponding to any of the determinant factors (1) to (4) from the parameter memory 12 in accordance with the current search state of the observation signal processing apparatus 1 such as the current vehicle state. The phase correction amount calculation section 10 determines the estimated relative speed $V_0$ used to determine the phase correction amount.

Using equation (7), the phase correction amount calculation section 10 determines the phase correction amount $\phi_0$ according to the estimated relative speed $V_0$. The phase-correction-weighted coherent integration section 11 then performs coherent integration on observation values as many as $NUM_{CI}$ per search for the number of times indicated by the coherent integration count $NUM_{CI}$ as expressed by equation (8).

$$\begin{aligned}
y &= \frac{1}{NUM_{CI}} \sum_{k=0}^{NUM_{CI}-1} x(k)\exp(j\phi_0 \cdot k) \\
&= \frac{1}{NUM_{CI}} \sum_{k=0}^{NUM_{CI}-1} (s(k) + n(k)) \cdot \exp(j\phi_0 \cdot k) \\
&= \frac{1}{NUM_{CI}} \sum_{k=0}^{NUM_{CI}-1} (s(0)\exp(j\phi \cdot k) + n(k)) \cdot \exp(j\phi_0 \cdot k) \\
&= \frac{s(0)}{NUM_{CI}} \sum_{k=0}^{NUM_{CI}-1} \exp(j(\phi + \phi_0) \cdot k) + \\
&\quad \frac{1}{NUM_{CI}} \sum_{k=0}^{NUM_{CI}-1} n(k) \cdot \exp(j\phi_0 \cdot k) \\
&= y_S + y_N
\end{aligned} \quad (8)$$

In this manner, the coherent integration output y is weighted by the phase correction amount $\phi_0$ and is integrated.

Based on the sample value models according to equations (1) through (6), equation (10) expresses a signal component ys of y and equation (11) expresses a noise component of y as follows.

$$y_S \triangleq \frac{s(0)}{NUM_{CI}} \sum_{k=0}^{NUM_{CI}-1} \exp(j(\phi+\phi_0)\cdot k) \qquad (9)$$

$$y_N \triangleq \frac{1}{NUM_{CI}} \sum_{k=0}^{NUM_{CI}-1} n(k)\cdot \exp(j\phi_0 \cdot k) \qquad (10)$$

The signal component ys is formatted as expressed by equation (11).

$$\begin{aligned} y_S &= \frac{s(0)}{NUM_{CI}} \sum_{k=0}^{NUM_{CI}-1} \exp(j(\phi+\phi_0)\cdot k) \\ &= \frac{s(0)}{NUM_{CI}} I \sum_{k=0}^{NUM_{CI}-1} \exp(j(\Delta\phi)\cdot k) \\ &= \frac{s(0)}{NUM_{CI}} \cdot \frac{1-\exp(j\cdot \Delta\phi \cdot NUM_{CI})}{1-\exp(j\cdot \Delta\phi)} \end{aligned} \qquad (11)$$

where $$\Delta\phi \triangleq \phi+\phi_0 = 2\omega_0 \cdot PRI \cdot \left(\frac{V}{V_c-V} - \frac{V_0}{V_c-V_0}\right)$$

Therefore, |ys| is equivalent to equation (12).

$$|y_S| = \left|\frac{s(0)}{NUM_{CI}} \cdot \frac{1-\exp(j\cdot \Delta\phi \cdot NUM_{CI})}{1-\exp(j\cdot \Delta\phi)}\right| = \left|\frac{s(0)}{NUM_{CI}}\right| \cdot \sqrt{\frac{1-\cos(\Delta\phi \cdot NUM_{CI})}{1-\cos(\Delta\phi)}} \qquad (12)$$

It is assumed that n(k) is a complex white Gaussian noise as expressed by equation (14).

$$n(k) \sim N\left(0, \frac{\sigma^2}{2}\right) + j\cdot N\left(0, \frac{\sigma^2}{2}\right) \qquad (13)$$

A noise component of y is expressed by equation (15) according to the central limit theorem.

$$y_N \sim N\left(0, \frac{\sigma^2}{2NUM_{CI}}\right) + j\cdot N\left(0, \frac{\sigma^2}{2NUM_{CI}}\right) \qquad (14)$$

The above-described equations are varied to develop equation (15) for expressing the SNR for y.

$$\begin{aligned} SNR_y = \frac{|y_S|^2}{\text{var}[y_N]} &= \frac{\left|\frac{s(0)}{NUM_{CI}}\right|^2 \cdot \frac{1-\cos(\Delta\phi\cdot NUM_{CI})}{1-\cos(\Delta\phi)}}{\frac{\sigma^2}{2NUM_{CI}}+\frac{\sigma^2}{2NUM_{CI}}} \\ &= \underbrace{\frac{|s(0)|^2}{\sigma^2}}_{[A]} \cdot \underbrace{\frac{1}{NUM_{CI}} \cdot \frac{1-\cos(\Delta\phi \cdot NUM_{CI})}{1-\cos(\Delta\phi)}}_{[B]} \end{aligned} \qquad (15)$$

In this equation, [A] can be described as the SNR per sample. [B] can be described as process gain $PG_y$ for the phase-correction-weighted coherent integration output.

According to the above-described equation, the process gain $PG_y$ for the coherent integration output y is expressed by equation (16).

$$PG_y = \frac{1}{NUM_{CI}} \cdot \frac{1-\cos(\Delta\phi \cdot NUM_{CI})}{1-\cos(\Delta\phi)} \qquad (16)$$

where $$\Delta\phi \triangleq 2\omega_0 \cdot PRI \cdot \left(\frac{V}{V_c-V} - \frac{V_0}{V_c-V_0}\right)$$

As shown in FIG. 1, the phase-correction-weighted coherent integration section 11 outputs the acquired coherent integration output y to the outside. A known target detection apparatus (not shown) analyzes and calculates the output to find the speed and the position of the target.

Figure 3:
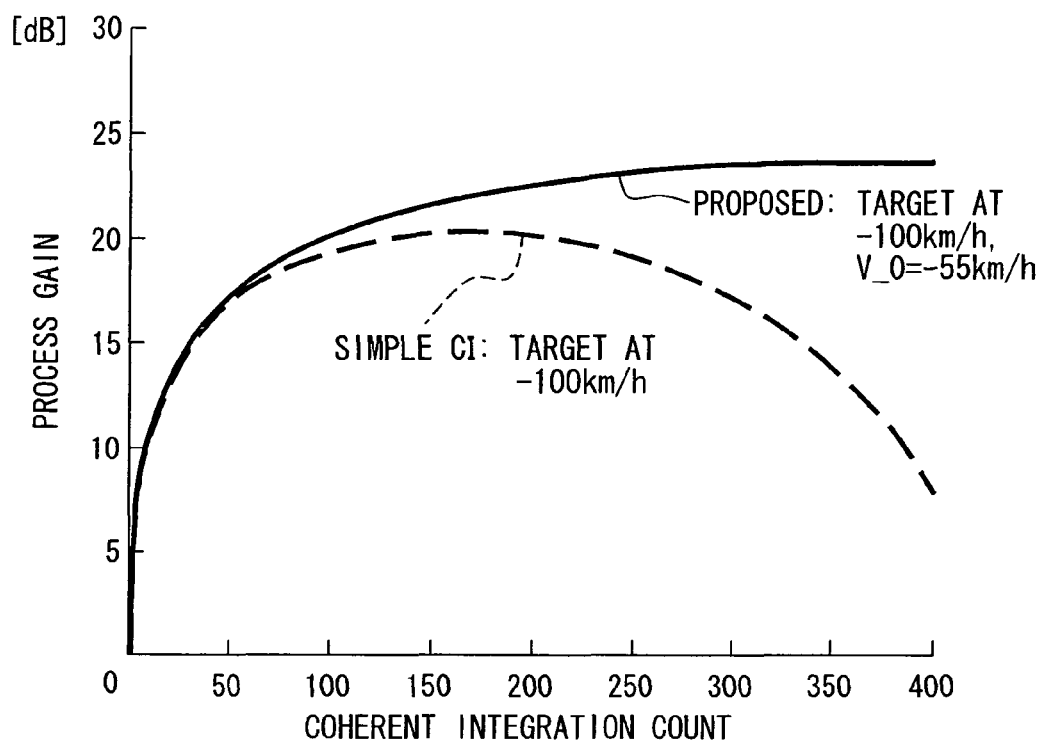
FIG. 3 is a graph showing relation between a coherent integration count and a process gain.

FIG. 3 exemplifies the comparison between two types of coherent integrations to study effectiveness of the present embodiment. One is to perform coherent integration on the observation values weighted according to the phase correction amount $\phi_0$ found based on the estimated relative speed $V_0$. The other is to simply perform coherent integration on the observation values. The conditions are $\omega_0$ set to $2\pi \times 29 \times 10^9$ [rad/s] and PRI set to 500 [ns].

The technique "Simple CI: target at −100 Km/h" indicated by a dotted line in FIG. 3 simply performs coherent integration on observation values for a target that moves at a relative speed of −100 Km/h or moves toward the observation signal processing apparatus 1 at 100 Km/h. In this case, the process gain drastically decreases at the coherent integration count around 200 or more. By contrast, the "proposed technique: target at −100 Km/h and V__0 set to −55 Km/h" indicated by a solid line in FIG. 3 assumes the estimated relative speed $V_0$ to be −55 Km/h and performs coherent integration on observation values weighted by the phase correction amount q for a target that moves at a relative speed of −100 Km/h or moves toward the observation signal processing apparatus 1 at 100 Km/h. In this case (present embodiment), the process gain does not decrease at the coherent integration count around 200 or more and indicates only a tendency to increase throughout the entire coherent integration.

As the example in FIG. 3 illustrates, the important point is that a high process gain can apparently result from the coherent integration performed with the weighting specified by the phase correction amount $\phi_0$ in accordance with the estimated relative speed $V_0$. This also applies even though the estimated relative speed $V_0$ is specified quite differently from the relative speed of an actual target to be observed.

It is assumed that one target moves away from the observation signal processing apparatus 1 and another target moves toward the same. In this case, positive and negative different estimated relative speeds $V_0$ are defined for these targets and are stored in the parameter memory 12. Three or more estimated relative speeds $V_0$ may be set and stored. Multiple estimated relative speeds $V_0$ are retrieved from the parameter memory 12 for a single target to be observed by the phase correction amount calculation section 10. Phase correction amounts for the retrieve estimated relative speeds $V_0$ are calculated with reference to the same target.

The observation data memory 6 stores observation values (samples) equivalent to the coherent integration count $NUM_{CI}$ per search. The phase-correction-weighted coherent integration section 11 performs the weighted coherent integration according to the phase correction amounts on the observation values with respect to each of the phase correction amounts. The phase-correction-weighted coherent integration section 11 supplies to the outside the coherent integration output y that has a larger absolute value than those of the other outputs resulting from the weighted coherent integration. This makes it possible to perform the coherent integration using phase correction amounts appropriate to the target to be observed. A high-SNR coherent integration value can be acquired when the coherent integration is performed on a wave reflected on the target having a relative speed with respect to a vehicle or a ship mounted with the observation signal processing apparatus 1.

What is claimed is:

1. An observation signal processing apparatus capable of successively transmitting pulse signals as search signals modulated by carrier waves a plurality of times per search from a transmission antenna to a domain to be observed, capturing a plurality of reflected signals, being part of the search signals reflected on a target in the domain, at a receiving antenna, performing correlative detection based on the captured reflected signals and delay modulation pulse signals equivalent to delayed version of the pulse signals modulated by the carrier waves to generate a plurality of observation values per search, performing coherent integration on the generated observation value, and supplying outward a specified coherent integration value per search as integration output, the observation value having a phase, which includes information about a relative distance to the target, and an amplitude, which includes information about a relative distance to the target and a reflected sectional area of the target, the observation signal processing apparatus comprising:

a first memory for storing a coherent integration count corresponding to the domain to be observed;

a search signal transmission section for retrieving the coherent integration count corresponding to the domain to be observed from the first memory and transmitting the pulse signals as the search signals equivalent to the retrieved coherent integration count from the transmission antenna;

an observation data memory for controlling the receiving antenna to capture reflected waves as the reflected signals for the transmitted pulse signals equivalent to the coherent integration count and storing the reflected signals as the observation values;

a second memory for storing an estimated relative speed for the search;

a phase correction amount calculation section for retrieving the estimated relative speed of the target from the second memory and calculating a phase correction amount based on the retrieved estimated relative speed; and a phase-weighted coherent integration section for performing phase-weighted coherent integration on the observation values equivalent to the coherent integration count based on the calculated phase correction amount and supplying outward the acquired integration output.

2. The observation signal processing apparatus of claim 1, wherein:

the phase correction amount calculation section determines a center value of estimated relative speeds in relation to the target to be searched for in a domain as the estimated relative speed.

3. The observation signal processing apparatus of claim 1, wherein:

the search signal transmission section is mounted on a vehicle; and the phase correction amount calculation section determines the estimated relative speed in accordance with an operation state of the vehicle.

4. The observation signal processing apparatus of claim 1, wherein:

the phase correction amount calculation section determines the estimated relative speed in accordance with a distance to a target to be searched for.

5. The observation signal processing apparatus of claim 1, wherein:

the search signal transmission section is mounted on a mobile body;

the second memory stores a negative estimated relative speed; and the phase correction amount calculation section retrieves the negative estimated relative speed from the second memory and calculates the phase correction amount, when the target moves toward the mobile object.

6. The observation signal processing apparatus of claim 1, wherein:

the phase correction amount calculation section retrieves a plurality of estimated relative speeds from the second memory for a same target and calculates a phase correction amount for each of the plurality of estimated relative speeds; and the phase-weighted coherent integration section performs phase-weighted coherent integration on observation values equivalent to the coherent integration count based on each of the calculated phase correction amounts and supplies outward an integration output having a larger absolute value.

7. The observation signal processing apparatus of claim 6, wherein:

the phase correction amount calculation section retrieves positive and negative estimated relative speeds from the second memory for the same target and calculates a phase correction amount for each of the retrieved positive and negative estimated relative speeds.

* * * * *